United States Patent [19]

Tobergte

[11] Patent Number: 5,519,386
[45] Date of Patent: May 21, 1996

[54] DATA EXCHANGE SYSTEM

[75] Inventor: Wolfgang Tobergte, Halstenbek, Germany

[73] Assignee: U.S. Philips Corporation, New York, N.Y.

[21] Appl. No.: 274,943

[22] Filed: Jul. 14, 1994

[30] Foreign Application Priority Data

Jul. 14, 1993 [DE] Germany ............... 43 23 530

[51] Int. Cl.⁶ ............................................. G08C 19/00
[52] U.S. Cl. ............................. 340/825.54; 340/825.31; 340/825.72; 455/343
[58] Field of Search ................. 340/825.54, 825.72, 340/825.31, 870.28, 870.31, 870.32; 455/41, 343

[56] References Cited

U.S. PATENT DOCUMENTS

| | | | |
|---|---|---|---|
| 4,688,036 | 8/1987 | Hirano | 340/825.54 |
| 4,835,531 | 5/1989 | Sato | 340/825.72 |
| 5,317,309 | 5/1994 | Vercellotti et al. | 340/825.72 |

FOREIGN PATENT DOCUMENTS

| | | |
|---|---|---|
| 3242551 | 5/1983 | Germany . |
| 9108325 | 6/1991 | WIPO . |

*Primary Examiner*—Michael Horabik
*Attorney, Agent, or Firm*—Michael J. Balconi-Lamica; David Schreiber

[57] ABSTRACT

A data exchange system is provided including a fixed station and portable data carrier for transmitting energy between the station and carrier. Both the fixed station and the portable data carrier operate in the active mode and the passive mode. The data carrier operates in an active mode only when energy transfer is required.

7 Claims, 1 Drawing Sheet

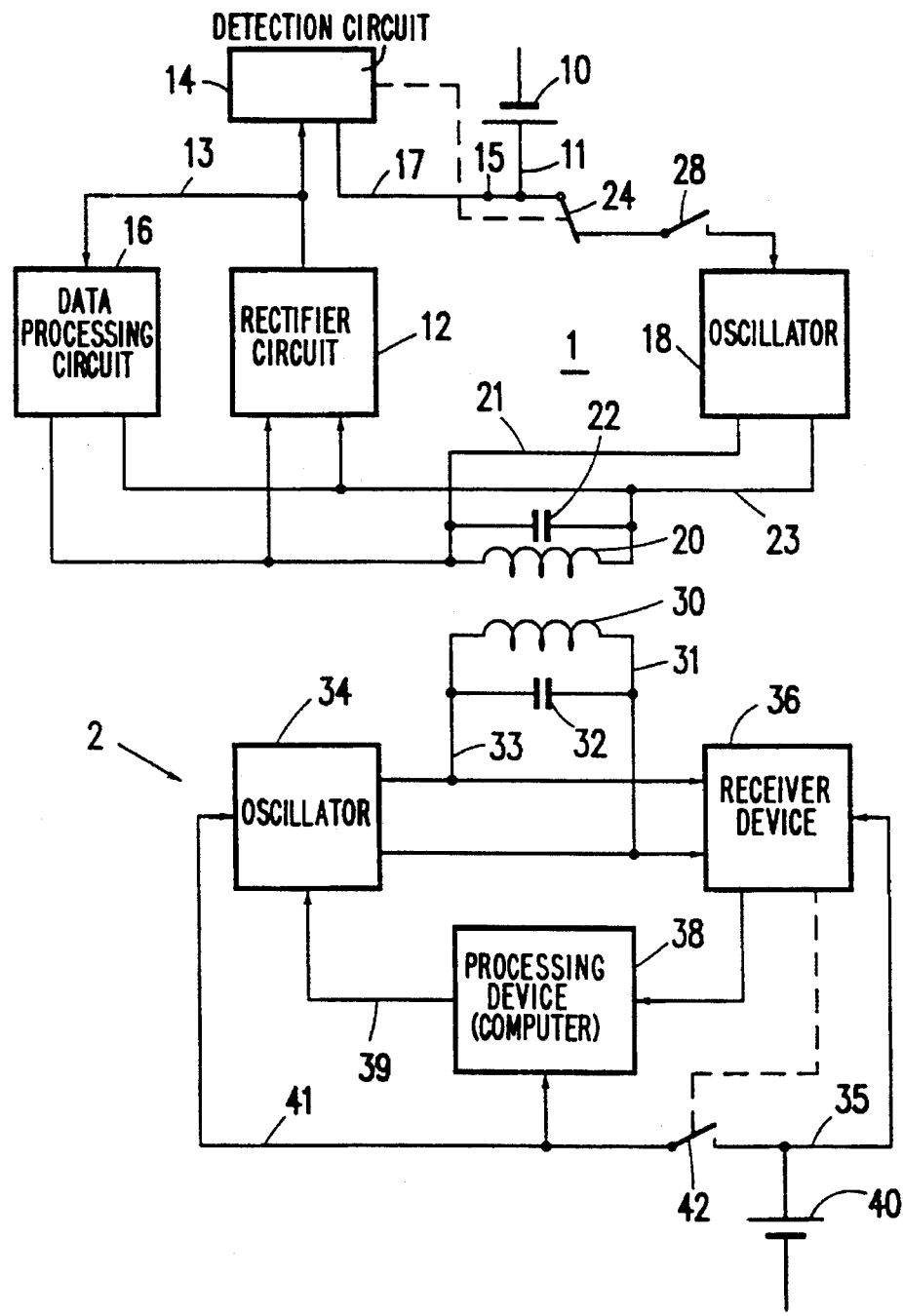
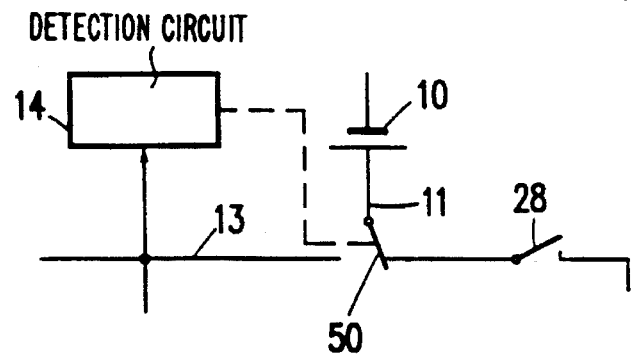
FIG. 1
FIG. 2

5,519,386

DATA EXCHANGE SYSTEM

BACKGROUND OF THE INVENTION

1. Field of the Invention

The invention relates to a data exchange system, comprising a fixed station and a portable data carrier which are coupled to one another by means for establishing a wireless connection for the transmission of high-frequency energy and data, the data carrier comprising at least an electric circuit with a supply device for generating the operating voltage for the circuit from the high-frequency energy received or from an energy source.

2. Discussion of the Related Art

A data exchange system of this kind is known from WO 92/08148. The data carrier of the system described therein serves to monitor a person in a security area. To this end, the data carrier periodically transmits very short, encoded information blocks which identity the data carrier and which are intercepted by an aerial and processed in a receiver. Moreover, at entrances of the security area there are provided interrogation devices which transmit a high-frequency electromagnetic field that also transfers information. When the data carrier approaches such an interrogation device, the energy taken up from the high-frequency electromagnetic field feeds the circuit of the data carrier and at the same time a battery accommodated in the data carrier is switched off, that is to say only for as long as the energy of the high-frequency field taken up by the data carrier is sufficiently high. The data carrier then returns its identification to the interrogation device which can thus grant access to the security area.

The interrogation device in this known system continually transmits a high-frequency field. Moreover, the interrogation device and the aerial with receiver constitute fully separate devices. Notably the tact that the interrogation device must continually transmit an electromagnetic field not only constitutes a kind of burden to the environment, but also gives rise to problems when the energy source present in the interrogation device is of limited capacity as is the case in, for example, a vehicle.

It is an object of the invention to provide a data exchange system of the kind set forth in which the power consumption in the fixed station is lower and which can be flexibly used for various applications.

SUMMARY OF THE INVENTION

This is achieved in accordance with the invention by that the data carrier is provided with an oscillator which can be operated as desired by the energy source, via a switch, and which feeds the means in the data carrier for the wireless connection during operation, the fixed station comprising means for receiving high-frequency energy from the data carrier in order to start the transmission of high-frequency energy in the fixed station.

Thus, in accordance with the invention neither the data carrier nor the fixed station is operated continually, but instead the data carrier can be operated in the active mode, preferably by a manually operated switch, so that in turn the fixed station is activated and transmits a high-frequency electromagnetic field whereby the data carrier is also supplied with energy so that it can quickly terminate its active mode of operation. Consequently, the energy source in the data carrier is loaded only briefly, and only if necessary, and also in the fixed station energy is spent only if a data exchange with a data carrier is actually required. Furthermore, because of the fact that in the active mode of operation of the data carrier the means for the wireless connection is fed by an oscillator, the remainder of the circuit of the data carrier can have a construction exactly like that of a data carrier operating in the passive mode only, so that such a circuit can be more economically used.

An oscillator always consists of an active element and one or more frequency-determining elements. In an embodiment according to the invention of a data exchange system of the kind disclosed in De 32 42 551 C2, in which the means for the wireless connection comprise at least a pair of coils, one coil thereof being arranged in the fixed station whereas the other coil is arranged in the data carrier and forms part of a resonant circuit, this resonant circuit constitutes a frequency-determining part of the oscillator. Thus, the oscillator additionally requires only one active element, so that an extremely simple construction is obtained, or only a very limited extension of the known passive data carrier is required.

The energy source can be realized in various ways, for example as a solar cell or as a battery as in the known data exchange system described above. However, because of the portable data carrier preferably being as small as possible, thus allowing only for an energy source of small voltline, the energy which is stored in this energy source, or which can be delivered thereby, is limited. In order to enable nevertheless as prolonged and as reliable use of the data carrier as possible, in an embodiment of the invention the energy source can be recharged. Because the energy source is loaded only briefly each time when the data carrier is used, an energy source of very small capacity suffices if frequent recharging is readily possible.

However, this cannot be ensured for all applications, for example an application for the opening of the doors of a vehicle and for making the starting possible. According to a further embodiment of the invention of a data exchange system comprising, like the described known system, means in the data carrier which responds to the received high-frequency energy by switching-over the energy source to generating the operating voltage from the energy received, means is provided for determining the power of the high-frequency energy to supply, when a power value is exceeded, the operating voltage from the supply device to a supply output for the recharging of the energy source. This embodiment is particularly effective when the energy source is an accumulator or a capacitor. When it is ensured that during use of the data carrier the distance between the data carrier and the fixed station is sufficiently small sufficiently frequently, the energy source will be frequently recharged so that the data carrier can operate in the active mode practically an unlimited number of times.

A particularly simple possibility of recharging the energy source is achieved in a further embodiment of the invention in that the energy source can be connected as desired, via a switch, to the oscillator or to the supply output. Preferably, the switch can be controlled by the means for determining the power. Automatic switching over then occurs not only from the active to the passive mode of operation of the data carrier, but at the same time also to the charging mode, without intervention by the user of the data exchange system being required. When the first and the second power value differ, the switch may have a central position in which the energy source is connected neither to the oscillator nor to the supply output. In the simplest case, however, in this embodiment the first and the second power value are equal, so that for an activated data carrier the energy source has two possible states only, i.e. feeding the oscillator or charging via the energy supply.

BRIEF DESCRIPTION OF THE DRAWING

Examples of embodiments of the invention will be described in detail hereinafter with reference to the drawing. Therein:

FIG. 1 shows a block diagram of a data exchange system in accordance with the invention, comprising a data carrier and a fixed station, and FIG. 2 shows a modification of a part of the data carrier.

DETAILED DESCRIPTION OF THE PREFERRED EMBODIMENTS

FIG. 1 shows the block diagram of a data carrier 1 and a fixed station 2. The taam carrier 1 comprises a coil 20 and a capacitor 22 which together constitute a resonant circuit. This resonant circuit is connected, via the leads 21 and 23, to a rectifier circuit 12 which generates, from the voltage arising in the resonant circuit when the coil 20 receives a high-frequency magnetic field, at least one direct voltage on a lead 13, which direct voltage supplies the data processing circuit 16. This circuit 16 comprises at least one memory, but often also several memories and a microprocessor which, however, are not shown separately for the sake of clarity. The circuit 16 is also connected, via the leads 21 and 23, to the resonant circuit 20, 22 and transfers the data to be transmitted preferably in that the resonant circuit is damped as function of the binary value of the data.

The fixed station 2 also comprises a resonant circuit which consists of a coil 30 and a capacitor 32 and which is connected to an oscillator 34 via leads 31 and 33. This oscillator 34 is designed for a high performance and receives its energy supply, via a lead 41, and also data to be transmitted, via a lead 39, from a processing device 38; this is customarily a computer which also receives its energy supply via the lead 41. The data received via the lead 39 are supplied, for example by frequency modulation or phase modulation, in the oscillator 34 to the resonant circuit 30, 32.

The leads 31 and 33 from the resonant circuit are also connected to a receiver device 36 which detects and regenerates the data modulated by the data carrier 1 and supplies them to the computer 38.

The elements described thus tar correspond to a conventional data exchange system with a data carrier 1 which is operated in the passive mode, i.e. a data carrier which can transmit data to the fixed station 2 only if the latter transmits a high-frequency electromagnetic field and if the latter field is received with sufficient strength by the coil 20 of the data carrier 1. In the system shown in FIG. 1 there are additionally provided an energy source 10 and an oscillator 18 which is also connected to the resonant circuit 20, 22 by way of the leads 21 and 23. When a user of the data carrier 1 wishes to commence a data exchange with a fixed station 2 which is in the rest state and which does not transmit a high-frequency magnetic field, a switch 28 in the data carrier 1 is closed so that the oscillator 18 is ted by the energy source 10, via the lead 11 and the switch 24, and triggers the resonant circuit 20, 22 which constitutes a or the frequency-determining part of the oscillator 18. The voltage thus arising in the resonant circuit 20, 22 is processed in the rectifier circuit 12 in the same way as a voltage in the resonant circuit 20, 22 which is produced by a high-frequency magnetic field from a fixed station. Thus, on the lead 13 there is formed a direct voltage which triggers the circuit 16 to supply data which are modulated in a customary manner on the oscillation produced therein, for example by damping the resonant circuits 20, 22.

The coil 30 in the fixed station 2 receives the signal transmitted by the data carrier 1 and generates a corresponding voltage on the leads 31 and 33, which voltage is evaluated by the receiver circuit 36 because this circuit 36 is continually kept in operation, via the lead 35, by an energy source 40 in the fixed station. Such a receiver circuit 36 customarily requires only a very small amount of electric energy. As soon as the receiver circuit 36 detects a signal voltage on the leads 31 and 33, it activates a switch 42 so that the lead 41 is also connected to the energy source 40 and the computer 38 and the oscillator 34 are switched on. The fixed station 2 then actively generates a high-frequency magnetic field which is taken up by the data carrier 1 and applied to the rectifier circuit 12. When the high-frequency power taken up by the data carrier 1 exceeds that produced by the oscillator 18 in the resonant circuit 20, 22 by a sufficient amount, the voltage oil the lead 13 is, for example, made to increase. A detection circuit 14 which is also controlled by this voltage and which detects this power increase, or this higher power applied to the rectifier circuit 12, then opens the switch 24 so that the oscillator 18 is switched off. The data carrier 1 then operates only in the passive mode on the basis of the high-frequency energy transmitted by the fixed station 2.

The rectifier circuit 12 may also comprise a stabilization circuit or voltage control circuit for the voltage oil the lead 13, and the detection circuit 14 may also be controlled by the stabilization or control signal from the rectifier circuit 12.

When the energy received by the coil 20 in the data carrier 1 is sufficiently high, the detection circuit 14 applies, via a lead 17, the voltage generated on the lead 13, or a voltage derived therefrom, to a supply output 15 which is connected to the energy source 10, via the lead 11, and which thus charges this source. As a result, the loss of energy occurring in the energy source 10 during the initial active mode of operation of the data carrier 1 call be readily compensated for again.

In the circuit shown in FIG. 1 the detection circuit 14 can respond to two different values of the high-frequency power received in that the switch 24 is opened for the first power value and that in the presence of a second, higher power value a voltage is applied to the supply output 15. However, it is alternatively possible to choose the two power values to be equal, so that at the same time the switch 24 is opened and a voltage is applied to the supply output 15.

FIG. 2 shows a slightly different implementation of the switching over of the energy source 10 from supplying the oscillator 18 to charging, notably when the voltage on the lead 13 corresponds to the voltage of the energy source 10. To this end, the energy source 10 is connected, via the lead 11, to a switch 50 which is controlled by the detection circuit 14. When a sufficiently high high-frequency power is received in the data carrier, the detection circuit 14 controls the switch 50 so that the lead 11 of the energy source 10 is connected instead to the lead 13, so that automatically the oscillator in the data carrier is switched off and the energy source 10 is charged.

What is claimed is:

1. A data exchange system for wireless exchange of high-frequency energy and data between a fixed station and a portable data carder, said data exchange system comprising:

a fixed station, wherein said fixed station comprises means for establishing a wireless connection in a first mode of operation corresponding to a rest state and in a second mode of operation corresponding to an active state; and a portable data carrier, said data carrier being operable in an active mode of operation for transmitting high-frequency energy and data and further being operable in a passive mode of operation, wherein said data carrier comprises (i) an electric circuit for providing data to be transmitted to said fixed station and for processing data which is received from said fixed station, (ii) a supply device for generating an operating voltage for the electric circuit, (iii) means for establishing a wireless connection for transmitting high-frequency energy and data and for receiving high-frequency energy and data, (iv) an energy source, (v) an oscillator operable during the active mode of said data carrier for triggering the wireless connection establishing means of said data carrier to transmit high-frequency energy and data to said fixed station, and (vi) a switch connected between the energy source and the oscillator for selectably operating the oscillator as desired to commence a data exchange, wherein an operation of the oscillator via the switch places said data carrier in the active mode, wherein during the active mode the supply device generates the operating voltage for the electric circuit from the energy source via the oscillator, further wherein said fixed station, operating in the first mode, in response to a receipt of transmitted high-frequency energy and data from said data carrier, thereupon begins operating in the second mode, actively transmitting, via the wireless connection establishing means of said fixed station, high-frequency energy and data for subsequent receipt thereof by said data carrier via the wireless connection establishing means of said data carrier, said data carder further comprising (vii) detection means, responsive to the high-frequency energy received from said fixed station, for switching off the oscillator, thereby switching over said data carrier from the active mode to the passive mode, and further wherein during the passive mode the supply device generates the operating voltage for the electric circuit from the received high-frequency energy.

2. The data exchange system as claimed in claim 1, wherein the means for establishing the wireless connection of said fixed station and said data carrier, together comprise at least a pair of coils, one coil thereof being arranged in said fixed station whereas the other coil is arranged in said data carrier, further wherein the coil arranged in said data carrier further constitutes part of a resonant circuit, still further wherein the resonant circuit constitutes a frequency-determining part of the oscillator.

3. The data exchange system as claimed in claim 1, wherein the energy source is a solar cell.

4. The data exchange system as claimed in claim 1, wherein the energy source is a rechargeable energy source.

5. The data exchange system as claimed in claim 1, further wherein the detection means of said data carrier still further comprises power determining means for determining a power of the high-frequency energy and for supplying, when a prescribed power value is exceeded, the operating voltage from the supply device to a supply output for charging the energy source.

6. The data exchange system as claimed in claim 5, still further wherein said data carrier further comprises a second switch, the second switch for selectively connecting the energy source to the oscillator or to the supply output.

7. The data exchange system as claimed in claim 6, further wherein the second switch is controlled by the power determining means.

* * * * *